US009162805B1

(12) United States Patent  (10) Patent No.: US 9,162,805 B1
Testa et al.  (45) Date of Patent: Oct. 20, 2015

(54) PALLET WRAP

(75) Inventors: Peter Testa, Chicago, IL (US); Matt Jacobs, Wilmette, IL (US)

(73) Assignee: PALLET WRAPZ, INC., Glenview, IL (US)

( * ) Notice: Subject to any disclaimer, the term of this patent is extended or adjusted under 35 U.S.C. 154(b) by 444 days.

(21) Appl. No.: 13/208,785

(22) Filed: Aug. 12, 2011

(51) Int. Cl.
*B65D 71/02* (2006.01)
*B65D 71/00* (2006.01)

(52) U.S. Cl.
CPC ............ *B65D 71/02* (2013.01); *B65D 71/0096* (2013.01); *B65D 2571/00055* (2013.01); *B65D 2571/00067* (2013.01)

(58) Field of Classification Search
CPC ............... B65D 71/0096; B65D 71/02; B65D 2571/00055; B65D 2571/00067
USPC ........................ 410/96–116; 206/597; 150/154
See application file for complete search history.

(56) References Cited

U.S. PATENT DOCUMENTS

| 754,811 | A | * | 3/1904 | Schlichter | 383/104 |
| 2,696,360 | A | * | 12/1954 | Toffolon | 206/597 |
| 3,185,197 | A | | 5/1965 | Spiro et al. | |
| 3,371,815 | A | | 3/1968 | Macomber | |
| 4,538,385 | A | * | 9/1985 | Kandarian | 150/154 |
| 4,852,330 | A | * | 8/1989 | Carangelo | 53/399 |
| 4,868,955 | A | * | 9/1989 | Magnant et al. | 24/306 |
| 4,876,841 | A | * | 10/1989 | Jensen | 53/399 |
| 5,226,544 | A | * | 7/1993 | Gallucci et al. | 206/597 |
| 6,224,260 | B1 | * | 5/2001 | Nickell et al. | 383/119 |
| 6,851,903 | B1 | * | 2/2005 | Foggy | 410/118 |
| 7,934,894 | B1 | * | 5/2011 | Temple | 410/97 |
| 8,292,559 | B1 | * | 10/2012 | Foggy | 410/96 |
| 8,302,267 | B2 | * | 11/2012 | Morikawa et al. | 24/302 |
| 2009/0245963 | A1 | * | 10/2009 | Schoor | 410/97 |
| 2009/0288980 | A1 | * | 11/2009 | Hadala | 206/597 |

FOREIGN PATENT DOCUMENTS

JP  2008189354  *  8/2008
JP  2010083584 A  *  4/2010

OTHER PUBLICATIONS

English Machine Translation of Kashika et al., Load Collapse Preventing Sheet, JP2010083584A, Published Apr. 15, 2010.

* cited by examiner

*Primary Examiner* — Tri Mai
(74) *Attorney, Agent, or Firm* — Vedder Price P.C.

(57) ABSTRACT

A reusable wrap for releasable securing laden goods on a pallet. One embodiment of the pallet wrap comprises a flexible wrap having a plurality of pockets adjacent its ends for receiving corresponding rods, and a plurality of hook and loop strap fasteners attached to one end of the wrap for engaging corresponding rings secured to the second end of the wrap to permit the straps to be folded back and attached to themselves to secure the wrap around the goods. Corner webbing members may be attached to the bottom of the wrap to assist in securing the wrap to the pallet itself during use. A hook and loop strap may also be attached to the top of the wrap to extend across the top of the loaded goods. Identification and/or shipping information or materials may be placed in a clear vinyl pocket for easy access and viewing.

20 Claims, 3 Drawing Sheets

PALLET WRAP

FIELD OF THE INVENTION

This invention relates in general to pallets wraps, and more specifically, to reusable pallet wraps.

BACKGROUND OF THE INVENTION

Pallets, typically in the form of a boxlike structure and having a flat top and slots or openings in the sides for receiving forks from a forklift of similar lifting device, are used in a wide variety of industries for storage, stacking and for transportation of goods. By some estimates, over five hundred thousand new pallets are produced each year and more than 2 billion pallets are in circulation in the United States alone.

In order to secure the stacked goods relative to the pallet for shipping and/or storage, it is common to use a shrink wrap or a stretch wrap. In view of the large number of pallets that may be used for any given entity, the use of a shrink wrap or stretch wrap can be very time consuming. Furthermore, as neither the shrink wrap nor the stretch wrap can be easily reused, it can also be very expensive and wasteful for entities that ship a lot of goods. In addition, although the shrink wrap or stretch wrap may be wrapped around the pallet itself during application to help secure the goods to the pallet, this can often interfere with the ability to transport the pallets using forklifts and the like.

While in recent years, it has been known to use reusable wraps, because of the flexible nature of the wraps, it is often difficult for individuals, especially those working by themselves, to apply the wrap around goods. Furthermore, the known wraps have not provided a reliable and easy means for securing the goods relative to the pallet.

SUMMARY OF THE INVENTION

The present invention is an improvement over the prior pallet wrapping materials in the way that the pallet wrap is secured about the goods and to the pallet itself. In particular, one embodiment of the pallet wrap comprises a flexible wrap having a plurality of pockets adjacent its ends for receiving corresponding rods, and a plurality of hook and loop strap fasteners attached to one end of the wrap for engaging corresponding rings secured to the second end of the wrap to permit the straps to be folded back and attached to themselves to secure the wrap around the goods. Corner members may be attached to the bottom of the wrap to assist in securing the wrap to the pallet itself during use. Hook and loop straps may also be attached to the top of the wrap to extend across the top of the loaded goods. Identification and/or shipping information or materials may be placed in a clear vinyl pocket for easy access and viewing.

It is therefore an object of the present invention to provide a new and improved reusable wrap for securing goods on a pallet.

Yet another object of the present invention is to provide a new and improved pallet wrap that is easy to use and operate.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
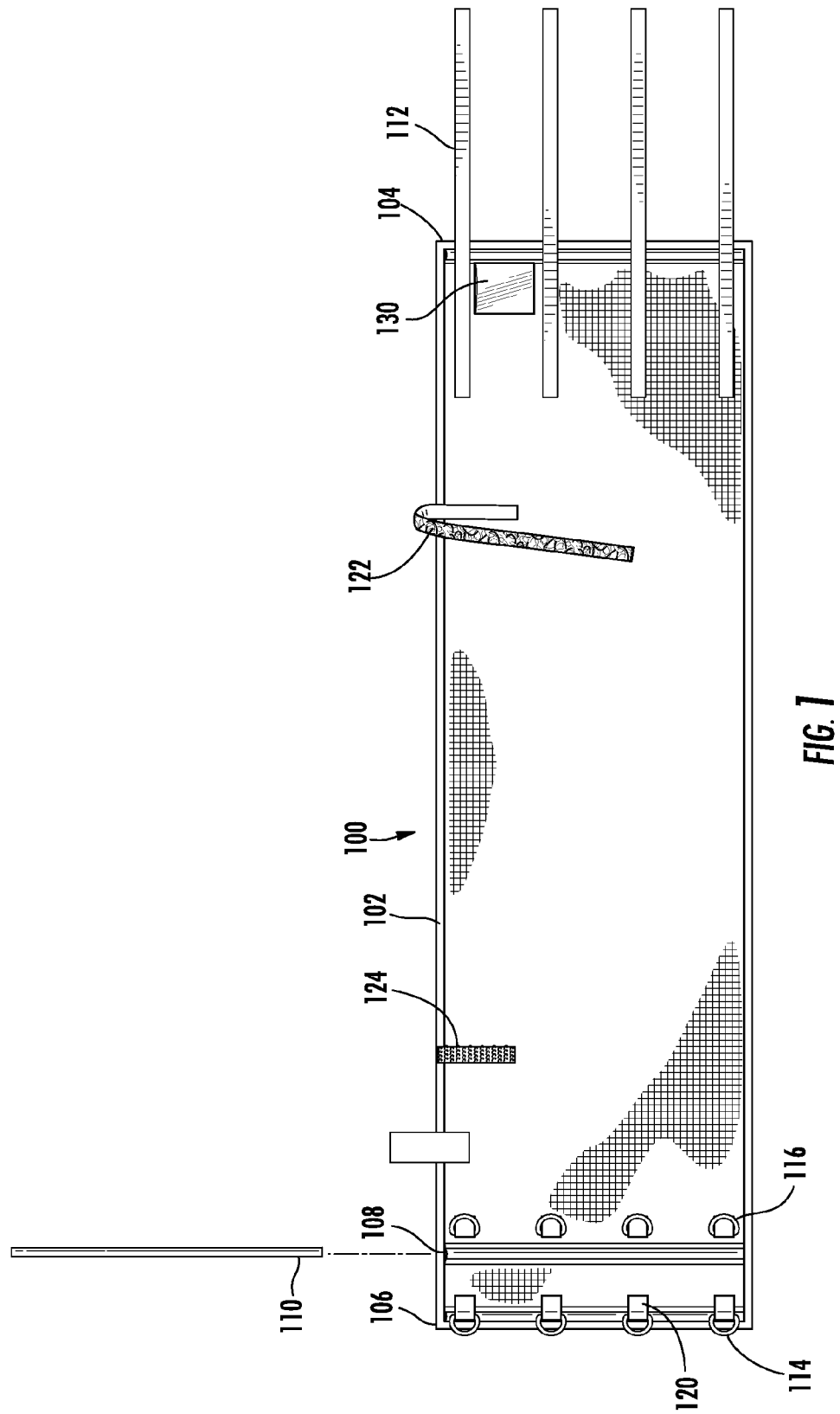
FIG. 1 is a partially exploded front elevated view of one embodiment of the strap of the present invention.
Figure 2:
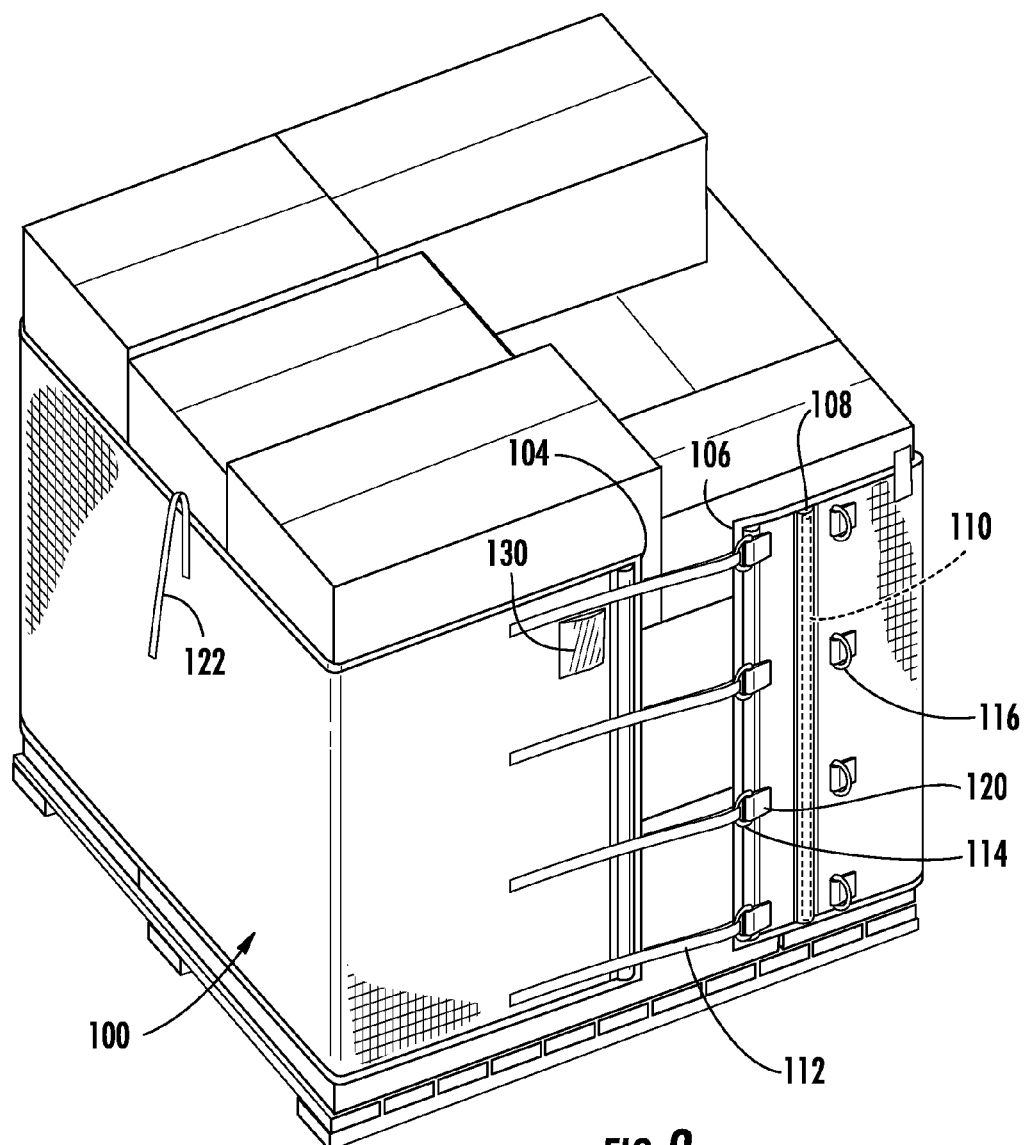
FIG. 2 is a top perspective view of the wrap of FIG. 1 applied about goods on a pallet.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims. Referring now to the drawings, and particularly to FIGS. 1 and 2, one embodiment of the improved pallet wrap of the present invention, generally designated by the numeral 100, is shown having: a rectangular wrap 102 having a first end 104, a second end 106 and a plurality of pockets 108 extending in a transverse direction thereon for receiving a plurality of corresponding elongated rigid members 110; a plurality of straps 112 attached to the wrap at the first end 104; and a series of rings 114, 116 on or proximate the second end 106 for receiving the straps 112.

In the embodiment shown in the drawings, the wrap is sized and shaped to circumvent most of the load on a pallet, leaving a gap between the ends 104, 106 to permit the straps 112 to engage the corresponding rings 114, 116. As an example, a wrap for use with a standard 48" by 40" pallet may be fourteen feet long; however, it is appreciated that the length of the wrap may vary depending on the size of the pallet and the particular goods being stored or transported therein. For use with standard loaded goods, the height of the wrap may be from two to six feet, but it is appreciated that the height also may vary depending on the type of goods being stored or transported.

While the wrap may be made out of a variety of materials that are durable and resistant to tearing or punctures, one known material is a vinyl coated polyester mesh such as, but not limited to, one having an 11 count 840 Denier with a tongue tear of 60×50 pounds and a grab tensile of 250×225 pounds.

Referring again to FIG. 1, the pockets extend transversely along the wrap on or proximate the first and second ends of the wrap. In one embodiment, each pocket is 1½ inches wide to accept a correspondingly sized elongated rigid member such as a rod or tube (e.g., a ¾ inch diameter PVC tube). The opening of the pocket is preferably proximate the top of the wrap to inhibit the tubes from falling out during use. While the top of the pockets may remain open, it is appreciated that the tubes may be secured within their respective pockets through the use of any known closing or securing means, including, but not limited to: a zipper; hook and loop fasteners on the inside of the pocket and the wrap; buttons or snaps; or a strap extending over and securing to the hole.

Straps 112 may be spaced along the first end 104 of the wrap and stitched to the wrap 102 using a nylon webbing, or attached thereto using other known means. In one embodiment, the straps are 2" wide and 3' long and include hook and loop fasteners. Rings 114 may be secured to the wrap 102 in positions proximate the second end 106 corresponding to the respective positions of the straps 112. Referring to FIG. 1, the rings may be located adjacent the pocket on the second end. While the rings may be secured to the wrap in any of the known ways, as shown in FIG. 1, the rings may be secured to the wrap through corresponding straps 120 that create a loop. While hook and loop fasteners and rings are shown and disclosed, it is appreciated that the straps may utilize other attachment members including, but not limited to, clips, brackets, snaps and the like.

A second set of rings 116 may also be located spaced apart from the first set of rings 114 to provide for extra support for the straps 112, and to also allow for the wrap 102 to overlap, if necessary, for use with smaller sized pallet loads. As shown in FIG. 1, the second set or series of rings may be positioned adjacent a third pocket that is offset from the second pocket and proximate the second end.

The pallet wrap 100 may also include a strap 122 stitched or otherwise attached to the wrap 102 using a nylon webbing or other known attaching means at the top of the wrap on one side. A corresponding attachment piece such as a strap 124 attached to the wrap 102 on the top of its other side permits the strap 122 to extend over the loaded goods and attach thereto during use to provide extra support and/or restraint for the goods.

A clear vinyl pocket 130 may be located in or on the wrap to allow shipping or identification information and materials to be easily stored and/or viewed during use. Private labels or emblems may also be attached or stitched into the wrap material for identification and marketing purposes.

Figure 3:
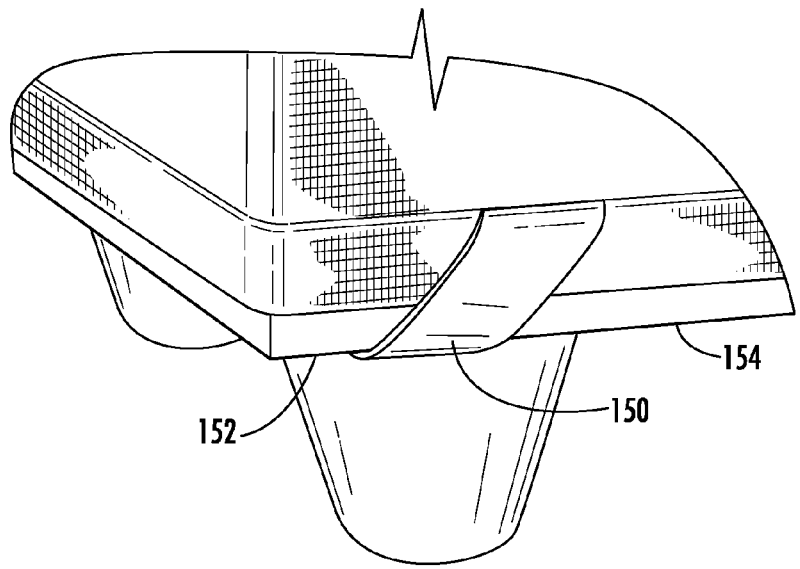
FIG. 3 is a partial perspective view of a corner member of an embodiment of the wrap of the present invention.
Figure 4:
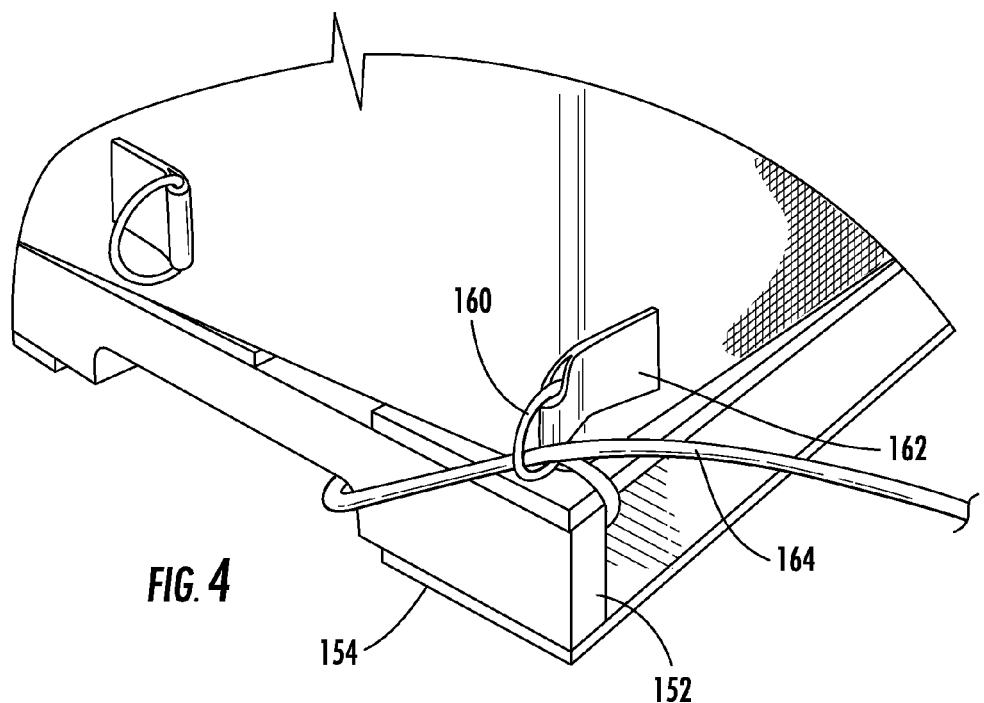
FIG. 4 is a partial perspective view of another embodiment of a corner member of the present invention.

Referring to FIG. 3, in order to secure the goods on the pallet to the pallet itself, the wrap may also include corner members 150 on the bottom that are spaced apart to correspond with the respective corners 152 of the pallet 154. In one embodiment, the webbing members are made of a nylon material that may extend over the corner. Referring to FIG. 3, the corner member may be a strap 150 that is attached to the bottom of the wrap and which may be placed over the corner 152 of the pallet 154 during use. While the corner members are shown as being attached to the bottom of the wrap, it is appreciated that they may be removably attached for replacement and use. FIG. 4 illustrates another type of corner member that may be used, namely, a D-ring 160 or other loop that is attached to the bottom of the wrap with a strap 162. In operation, the D-ring is position adjacent a corner 152 of the pallet 154 to permit a rope, strap, cable tie 164 or the like to extend through the D-ring 160 and wrap around or go through the corner 152 to secure the wrap to the pallet 154. Multiple D-rings may be located along the bottom of the wrap to permit the wrap to be used with pallets of varying sizes.

In operation, a user may align the wrap 102 so that the first webbing member 150 aligns with, and may be placed over, the first corner section 152 of the pallet 154. One operator may then grab the other end of the wrap and encircle the goods on the pallet. It is also appreciated that the webbing may be secured after encircling the goods, or not used at all, in which case the first end of the wrap would be held in place while the second end of the wrap is pulled around the loaded goods. Once the wrap has been placed about the goods, the straps may be inserted through the respective rings, pulled taut, and then folded back and attached to themselves. The top strap may then be extended over the top of the goods and secured to corresponding strap on the other side. Information regarding the shipping or contents may be placed within the clear vinyl pocket for easy access.

It will be understood that modifications and variations may be effected without departing from the scope of the novel concepts of the present invention, but it is understood that this application is limited only by the scope of the appended claims.

The invention claimed is:

1. A wrap for securing goods relative to a pallet having four corners comprising:

a flexible elongated wrap having a top, a bottom, a first end, a second end, a first pocket extending in a transverse direction proximate the first end, and a second pocket extending in a transverse direction proximate the second end and a third pocket extending in a transverse direction and spaced a predetermined distance from the second end;
 a first elongated rigid member removably located within the first pocket;
 a second elongated rigid member removably located within the second pocket;
 a plurality of straps each attached at a separate region of attachment to the wrap proximate the first end, the regions of attachment being separated from the first pocket by a distance, wherein there is no separate reinforcing member spanning the distance between any of the regions of attachment and the first pocket; and
 a first plurality of attaching members attached to the wrap proximate the second end and the first pocket; and
 a second plurality of attaching members attached to the wrap and spaced apart from the first plurality of attaching members proximate the third pocket.

2. The wrap of claim 1 wherein the first plurality of attaching members include a first series of rings.

3. The wrap of claim 2 wherein the first series of rings extend in a transverse direction on the wrap adjacent the second pocket.

4. The wrap of claim 2 wherein the second plurality of attaching members include a second series of rings offset from the first series of rings.

5. The wrap of claim 4 wherein the third pocket is adapted to accept the second elongated rigid member.

6. The wrap of claim 5 wherein the first series of rings extends in a transverse direction adjacent the second pocket and the second series of rings extends in a transverse direction adjacent the third pocket.

7. The wrap of claim 1 wherein the plurality of straps include hook and loop fasteners.

8. The wrap of claim 1 wherein the wrap comprises a vinyl coated polyester mesh.

9. The wrap of claim 8 wherein the mesh has an 11 count 840 Denier.

10. The wrap of claim 1 which further comprises means for releasably securing the rigid member within the pocket.

11. The wrap of claim 1 wherein the rigid members are PVC tubes.

12. The wrap of claim 1 which further comprises a top strap attached at the top and an attachment piece attached to the top a distance from the top strap to permit the top strap and attachment piece to attach together over the goods when the wrap is in use.

13. The wrap of claim 1 which further comprises corner members spaced apart along the bottom of the wrap for engaging the corners of the pallet.

14. The wrap of claim 13 wherein the corner members are made of nylon.

15. The wrap of claim 13 wherein the corner members are fixed to the wrap.

16. The wrap of claim 13 wherein the corner members include a ring attached to the wrap.

17. The wrap of claim 1 which further comprises a clear pocket.

18. The wrap of claim 17 where the clear pocket is made of vinyl.

19. The wrap of claim 1 wherein each strap of the plurality of straps is configured to pass through the first plurality of attaching members or the second plurality of attaching members and releasably connect on itself.

20. The wrap of claim 1 wherein the second pocket includes a proximal edge adjacent the second end and a distal edge opposite the proximal edge, the first plurality of attaching members attached to the wrap adjacent the distal edge of the second pocket.

\* \* \* \* \*